US009063716B2

(12) United States Patent
Okabe et al.

(10) Patent No.: US 9,063,716 B2
(45) Date of Patent: Jun. 23, 2015

(54) IMAGE PROCESSING APPARATUS AND METHOD FOR INTERRUPTING A POWER SUPPLY IN RESPONSE TO A USER'S OPERATION OR A KERNEL OF THE OPERATING SYSTEM TO SWITCH THE POWER SUPPLY BETWEEN A SUPPLY OF POWER AND AN INTERRUPTION OF POWER TO THE APPARATUS, WHEN A TIME LAPSE SINCE AN INTERRUPT REQUEST NOTIFICATION WAS SENT, EXCEEDS ONE OF A PLURALITY OF PREDETERMINED TIMES

(75) Inventors: Kiwamu Okabe, Kanagawa (JP); Hidekazu Segawa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 846 days.

(21) Appl. No.: 13/114,457

(22) Filed: May 24, 2011

(65) Prior Publication Data
US 2011/0302448 A1 Dec. 8, 2011

(30) Foreign Application Priority Data
Jun. 2, 2010 (JP) ................. 2010-127242

(51) Int. Cl.
*G06F 1/26* (2006.01)
*G06F 1/30* (2006.01)
(Continued)

(52) U.S. Cl.
CPC .............. *G06F 1/26* (2013.01); *G03G 15/5004* (2013.01); *H04N 1/00891* (2013.01);
(Continued)

(58) Field of Classification Search
CPC ..................................... G06F 1/26; G06F 1/30
USPC .................................................. 713/323, 300
See application file for complete search history.

(56) References Cited

U.S. PATENT DOCUMENTS 5,815,409 A * 9/1998 Lee et al. ...................... 700/286
6,286,106 B1 9/2001 Flannery
(Continued)

FOREIGN PATENT DOCUMENTS

CN 1772482 A 5/2006
JP 3-137864 6/1991
(Continued)

OTHER PUBLICATIONS

Extended European Search Report issued Sep. 30, 2011, in European Patent Application No. 11167743.1.
(Continued)

*Primary Examiner* — Jaweed A Abbaszadeh
*Assistant Examiner* — Terrell Johnson
(74) *Attorney, Agent, or Firm* — Oblon, McClelland, Maier & Neustadt, L.L.P.

(57) ABSTRACT

An image processing apparatus includes: a switch of a main power supply unit that is switched between ON and OFF in response to a user's operation so as to switch the power supply between a supply of power and an interruption of the supply; a first notification unit that sends an interrupt request notification for requesting to interrupt a process in a recoverable way to all of or a part of the applications being run if the switch of a main power supply unit is turned off; and a power supply control unit that interrupts the supply from the power supply when a time lapse, that is measured since a time when the notification unit has sent the interrupt request notification, exceeds a first predetermined time.

9 Claims, 12 Drawing Sheets

(51) Int. Cl.
*G03G 15/00* (2006.01)
*H04N 1/00* (2006.01)

(52) U.S. Cl.
CPC ... *H04N 1/00928* (2013.01); *H04N 2201/0081* (2013.01); *H04N 2201/0082* (2013.01); *H04N 2201/0093* (2013.01)

(56) References Cited

U.S. PATENT DOCUMENTS

| | | | |
|---|---|---|---|
| 6,438,684 B1 * | 8/2002 | Mitchell et al. | 713/1 |
| 6,661,123 B2 | 12/2003 | Hsu | |
| 2003/0111911 A1 | 6/2003 | Hsu | |
| 2004/0250149 A1 * | 12/2004 | Tsai et al. | 713/330 |
| 2005/0138447 A1 * | 6/2005 | Kobayashi et al. | 713/300 |
| 2005/0223245 A1 * | 10/2005 | Green et al. | 713/300 |
| 2009/0161162 A1 * | 6/2009 | Ishii | 358/1.16 |
| 2011/0052243 A1 * | 3/2011 | Suzuki | 399/88 |
| 2011/0302448 A1 * | 12/2011 | Okabe et al. | 714/14 |

FOREIGN PATENT DOCUMENTS

| | | |
|---|---|---|
| JP | 7-312048 | 11/1995 |
| JP | 10-302376 | 11/1998 |
| JP | 2000-113563 | 4/2000 |
| JP | 2006-11751 | 1/2006 |
| JP | 2006-114145 | 4/2006 |
| JP | 2007-208864 | 8/2007 |
| JP | 2007-306143 | 11/2007 |
| JP | 2007-334906 | 12/2007 |
| JP | 4145185 | 6/2008 |
| TW | 200428190 | 12/2004 |

OTHER PUBLICATIONS

Chinese Office Action issued Sep. 30, 2013, in China Patent Application No. 201110152106.X (with English translation).

* cited by examiner

IMAGE PROCESSING APPARATUS AND METHOD FOR INTERRUPTING A POWER SUPPLY IN RESPONSE TO A USER'S OPERATION OR A KERNEL OF THE OPERATING SYSTEM TO SWITCH THE POWER SUPPLY BETWEEN A SUPPLY OF POWER AND AN INTERRUPTION OF POWER TO THE APPARATUS, WHEN A TIME LAPSE SINCE AN INTERRUPT REQUEST NOTIFICATION WAS SENT, EXCEEDS ONE OF A PLURALITY OF PREDETERMINED TIMES

CROSS-REFERENCE TO RELATED APPLICATIONS

The present application claims priority to and incorporates by reference the entire contents of Japanese Patent Application No. 2010-127242 filed in Japan on Jun. 2, 2010.

BACKGROUND OF THE INVENTION

1. Field of the Invention

The present invention relates to an image processing apparatus.

2. Description of the Related Art

Conventional methods in the related art to turn off a power supply to an information processing apparatus can be classified into two groups. (For example, see Japanese Patent Application Laid-open No. 2006-114145, Japanese Patent Application Laid-open No. H10-302376, Japanese Patent Application Laid-open No. 2007-208864, Japanese Patent Application Laid-open No. 2000-113563, Japanese Patent Application Laid-open No. 2007-334906, Japanese Patent Application Laid-open No. H7-312048, Japanese Patent Application Laid-open No. 2006-011751, and Japanese Patent Application Laid-open No. H3-137864.) One method is to turn off a switch of a main power supply. The switch of the main power supply is a hardware switch that switches between ON and OFF for a power supply to the information processing apparatus. With this method, it is possible to immediately interrupt the power supply to the information processing apparatus. The other method is to use software to control an interruption process of the power supply to the information processing apparatus by pushing a manual operation button such as a key button to switch from the main power supply to a sub-power supply.

However, if the former method is adopted, three kinds of problems may occur. First, (a) a defective sector is likely to occur in a hard disk that is contained in the information processing apparatus if the power supply to the hard disk is interrupted while information data is written in the hard disk. Second, (b) a file system is likely to be damaged if the power supply is turned off before writing process of management information on the file system is completed. Third, (c) inconsistency in a data set is likely to occur if the power supply is turned off before writing process of the data set by an application in the information processing apparatus to the hard disk is completed.

A known technique to prevent these problems is to build a journaling file system in a hard disk. However, with this technique, it is still difficult to prevent the problem (c). Furthermore, in an information processing apparatus such as an image processing apparatus, data is not managed by a file system. Instead, data is directly stored in a hard disk so as to keep high efficiency in writing data. In such information processing apparatuses, it has been difficult to prevent the problems in (a), (b), and (c).

In the latter method, in general, when the key button to switch to the sub-power supply is pushed, a notification indicative of the interruption of the power supply is sent to each application running on the information processing apparatus, and each application performs a finalizing processing so that no abnormal interruption is caused even when the power supply is turned off. In such applications, the interruption of the power supply may be rejected when the finalizing processing has not normally finished or the finalizing processing can not be carried out. In such a case, it has been difficult to interrupt the power supply to the information processing apparatus while an application is rejecting the interruption of the power supply. In such systems, there has been an occasion in which a user forcibly interrupts the power supply by turning off the switch of the main power supply. Thus, similar the former method, it has been difficult to prevent the problems (a), (b), and (c).

The invention has been finalized in consideration of the above-described situation, and an object of the invention is to provide an image processing apparatus that is capable of interrupting the power supply in a short period of time in response to a user's operation for requesting the interruption of the power supply by suppressing an occurrence of abnormality in writing to a nonvolatile storage unit.

SUMMARY OF THE INVENTION

It is an object of the present invention to at least partially solve the problems in the conventional technology.

According to an aspect of the present invention, there is provided an image processing apparatus including: a switch of a main power supply unit that is switched between ON and OFF in response to a user's operation so as to switch the power supply between a supply of power and an interruption of the supply; a first notification unit that sends an interrupt request notification for requesting to interrupt a process in a recoverable way to all of or a part of the applications being run if the switch of a main power supply unit is turned off; and a power supply control unit that interrupts the supply from the power supply when a time lapse, that is measured since a time when the notification unit has sent the interrupt request notification, exceeds a first predetermined time.

According to another aspect of the present invention, there is provided an image processing method for an image processing apparatus having a plurality of applications including at least an application for carrying out writing to a nonvolatile storage unit and an application for carrying out an image process that are executable thereon, the image processing method including: switching, by a switch of a main power supply unit, between ON and OFF in response to a user's operation so as to switch the power supply between a supply of power and an interruption of the supply; notifying, by a first notification unit, an interrupt request notification for requesting to interrupt a process in a recoverable way to all of or a part of the applications being run if the switch of a main power supply unit is turned off; and interrupting, by a power supply control unit, the supply from the power supply when a time lapse, that is measured since a time when the notification unit has sent the interrupt request notification, exceeds a first predetermined time.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an image processing apparatus according to the invention is described in detail with reference to the accompanying drawings.

First Embodiment

Figure 1:
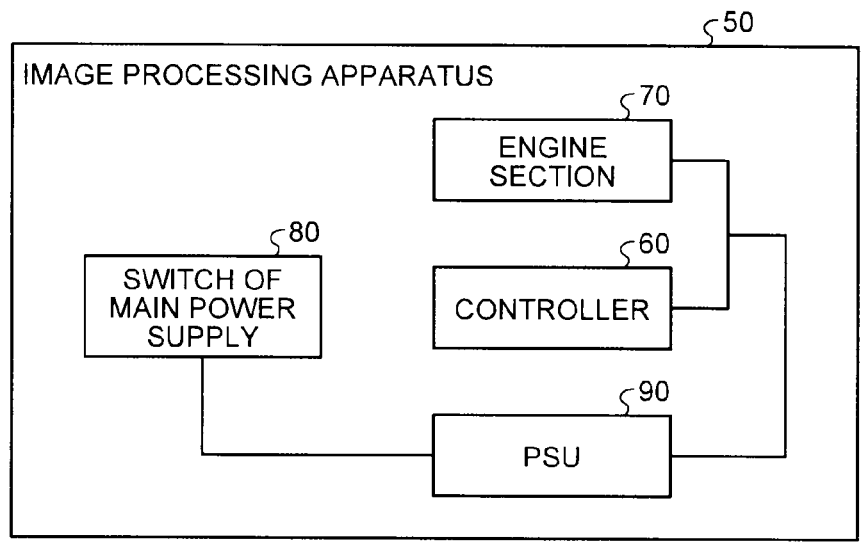
FIG. 1 is a diagram illustrating an outline of a hardware configuration of an image processing apparatus according to a first embodiment.

First, the outline of the hardware configuration of an image processing apparatus of this embodiment is described with reference to FIG. 1. An image processing apparatus 50 of this embodiment includes a controller 60, an engine section 70, a switch of a main power supply 80, and a power supply unit (PSU) 90. The controller 60 is a controller that controls the entire image processing apparatus 50 and controls drawing, communications, inputs from an operation section (not shown), and displaying information on a display section. The engine section 70 is a printer engine or the like that is connectable to a PCI (protocol control information) bus, and is, for example, a monochrome plotter, a one-drum color plotter, a four-drum color plotter, a scanner, a facsimile unit, or the like. The engine section 70 includes an image processing part such as error diffusion or gamma conversion, in addition to a so-called engine part such as a plotter. The PSU 90 transforms an alternating-current voltage supplied by an alternating current (AC) power supply to a direct-current voltage (also referred to as power), supplies power to the controller 60, and supplies power to the engine section 70 under the control of the controller 60. The switch of the main power supply 80 is a switch that is switched between ON and OFF in response to a user's operation so as to switch the power supply and to interrupt the power supply, and outputs a signal based on ON-and-OFF switching.

Figure 2:
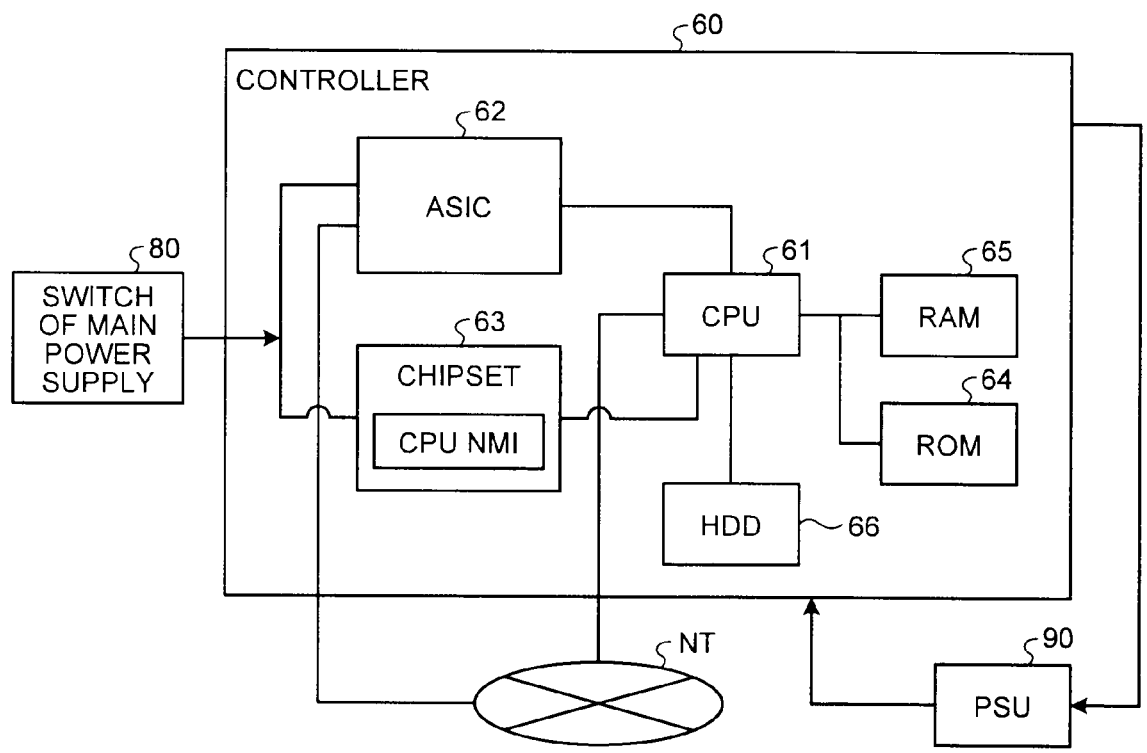
FIG. 2 is a diagram illustrating an outline of a configuration of a controller 60.

Next, an outline of a configuration of the controller 60 is described with reference to FIG. 2. The controller 60 includes a central processing unit (CPU) 61, an application specific integrated circuit (ASIC) 62, a chipset 63, a read only memory (ROM) 64, a random access memory (RAM) 65, and a hard disk drive (HDD) 66. The ROM 64 stores various programs, such as an operating system (OS) and various applications, and various kinds of data. As described below, the applications include a power saving control program to control to turn off the power supply, a program to perform a printing process that is a process to be executed in the engine section 70, a program to perform a communication process through a network NT as a process, and the like. The RAM 65 stores various programs and various kinds of data to be used in executing various computer programs. The HDD 66 stores various kinds of data such as image data subjected to image processing and various computer programs. The CPU 61 executes various computer programs stored in the ROM 64 or the HDD 66 to control the entire image processing apparatus 50. The CPU 61 also controls communication with an external apparatus through the network. The ASIC 62 is an image processing IC (Integrated Circuit) having image processing hardware components, and performs various image processes on image data under the control of the CPU 61. The chipset 63 has a CPU non-maskable interrupt (NMI) that is an interrupt request terminal to request the CPU 61 for a non-maskable interrupt from software. The CPU NMI outputs, to the CPU 61, a signal output when the switch of the main power supply 80 is turned off.

With the hardware configuration briefly described above, description is provided next for various functions which are realized by the CPU 61, that is included in the image processing apparatus 50, when the CPU 61 executes various programs stored in the ROM 64 or the HDD 66. Here, the respective functions are described focusing on various programs which are executed by the CPU 61. An interrupt detection thread is generated by the kernel of the OS to each program. If a signal is output from the CPU NMI when the switch of the main power supply 80 is turned off in response to the user's operation, the interrupt detection thread detects the signal and outputs an interruption signal to turn off the power supply from the PSU 90 as an interrupt signal to the power saving control program. If the interrupt signal is input, the power saving control program sends an interrupt request notification for requesting to interrupt a process in a recoverable way to all the applications executed by the CPU 61 excluding the power saving control program, and outputs an interruption signal to turn off the power supply from the PSU 90 to the controller 60 and the engine section 70 when a time lapse, that is measured since a time when the notification has been sent, reaches a first predetermined time. The first predetermined time is set beforehand by estimating a time needed for each application to interrupt a process in the recoverable way. If the power-off notification is received, each application is not allowed to reject the request and interrupts a process in the recoverable way in response to the notification. Specifically, it is exemplified as follows. If the power-off notification is received while an application carries out a process for writing data to the HDD 66, the application completes a writing of a data set which is a unit of writing to the HDD 66 or the application completes writing the management information of the file system to the HDD 66 in such a way that the application ends up with writing image data to the HDD 66 by keeping consistency in the image data when the power supply is recovered to the image processing apparatus 50 after the power supply to the image processing apparatus is turned off. When an application carries out a process for performing communication through the network NT, the communication is interrupted. Although the communication being performed before shutting off the power supply to the image processing apparatus 50 is not recovered after the image processing apparatus 50 is reactivated, if the communication is interrupted in a recoverable way, it is possible for the application to carry out a new communication. When an application performs an image processing on the engine section 70, the image processing is interrupted. Although the image processing being performed before shutting off the power supply to the image processing apparatus 50 is not recovered after the image processing apparatus 50 is reactivated, since image processing is interrupted in a recoverable way, the application can newly perform an image processing.

As described above, in this embodiment, when the switch of a main power supply 80 serving as hardware is turned off, the power supply is not immediately interrupted. Instead, with the operation to switch off the switch of the main power supply 80, the interruption of the power supply is controlled by various programs which are executed by the CPU 61. That is, the image processing apparatus 50 of this embodiment interrupts the power supply by software via the operation in hardware.

Figure 3:
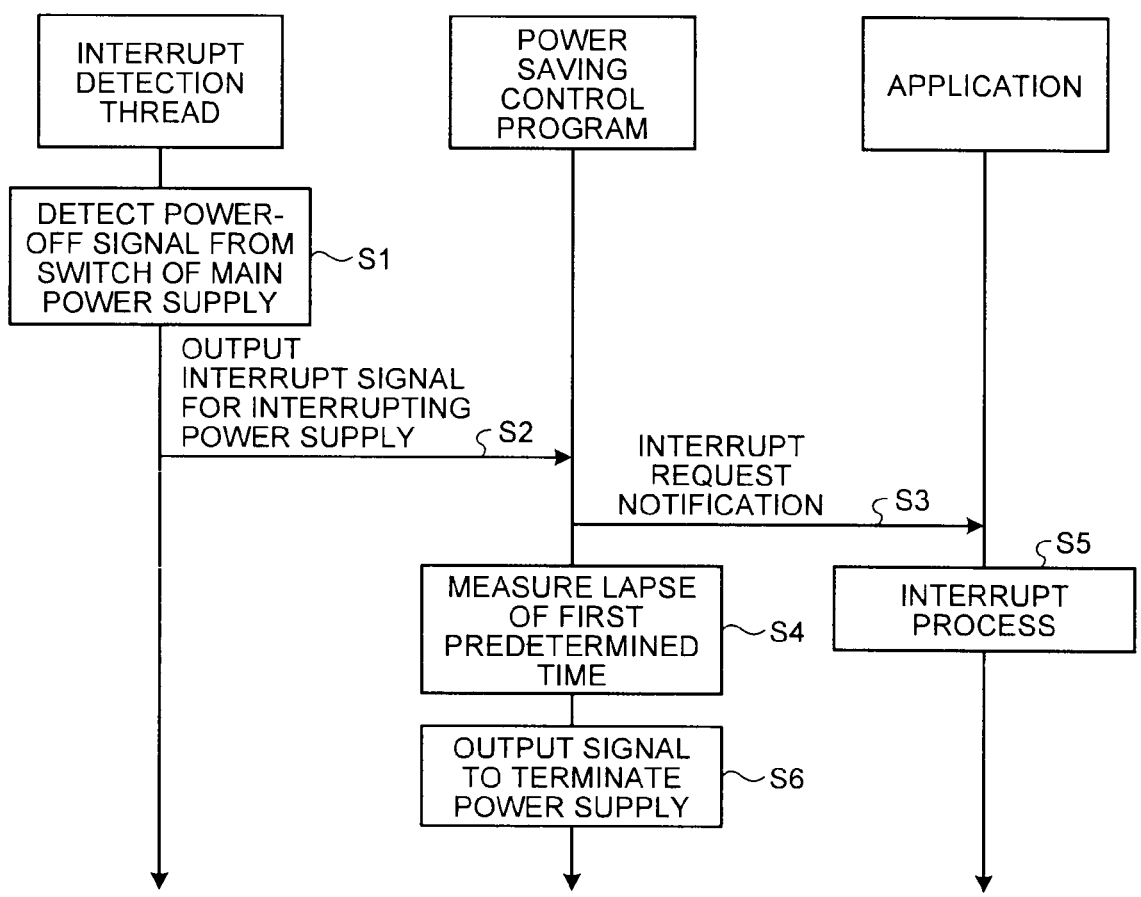
FIG. 3 is a flowchart showing a procedure in a power off control process in an image processing apparatus 50.

Next, the procedure in an interruption control process for the power supply that is carried out in the image processing apparatus 50 of this embodiment is described with reference to FIG. 3. If a signal is output from the CPU NMI when the switch of a main power supply 80 is turned off by the user's operation, an interrupt detection thread that operates in the kernel executed by the CPU 61 detects the signal (Step S1) and outputs a signal to turn off the power supply from the PSU 90 as an interrupt signal to the power saving control program (Step S2). If the interrupt signal is input, the power saving control program sends an interrupt request notification for requesting to interrupt processes in a recoverable way to all the applications executed by the CPU 61 excluding the power saving control program (Step S3). Thereafter, the power saving control program starts to measure a lapse of the first predetermined time (Step S4). In the meantime, if the interrupt request notification is received, each application interrupts a process in a recoverable way in response to the notification (Step S5). If the measurement of the lapse of the first predetermined time finishes, the power saving control program outputs an interruption signal of the power supply (Step S6). The interruption signal of the power supply is input into the PSU 90, the power supply from the PSU 90 to the controller 60 and the engine section 70 is turned off, and the power supply to the image processing apparatus 50 is turned off.

As described above, with the operation to switch off the switch of a main power supply 80 serving as hardware, the interruption of the power supply from the AC power supply to the image processing apparatus 50 is controlled by software to disable the control via hardware alone. With this configuration, it is possible to reduce the possibility that (a) a defective sector occurs caused by an immediate interruption of the power supply to the HDD 66 while an application is writing data to the HDD 66. It is also possible to reduce the possibility that (b) the file system is damaged because the power supply is immediately turned off before the management information of the file system in the HDD 66 is completely written. It is also possible to reduce the possibility that (c) inconsistency of data occurs because the power supply is turned off before an application finishes writing a data set as a unit in a writing process to the HDD 66.

For example, as in the related art, when the power supply is turned off by pushing the key button to switch to the sub-power supply, an application may reject the interruption of the power supply, and while the application is rejecting the interruption of the power supply, there is a case in which the power supply cannot be turned off. An application which rejects the interruption of the power supply refers to, for example, an application which performs an image processing as a process, an application which performs a communication process through the network NT as a process, or the like. However, taking into consideration the user's intention, it is preferable to turn off the power supply as quickly as possible. There has been a possibility that any one of the problems (a), (b), and (c) listed above may occur if the power supply is forcibly turned off by switching off the switch of the main power supply while an application is rejecting the interruption of the power supply.

For this reason, in this embodiment, taking account of a status of an application and the user's intention, when the switch of a main power supply 80 is manipulated to turn off, by interrupting a running process of an application in a recoverable way, and by interrupting the power supply automatically after a lapse of the first predetermined time that is estimated to be sufficiently long for the process to be terminated in a recoverable way. Thus, in the image processing apparatus 50, it becomes possible to interrupt the power supply in a short period of time while suppressing the occurrence of abnormality in writing image data to a nonvolatile storage unit.

A hardware interrupt is executed on the CPU 61 in such a way that the CPU NMI outputs the interrupt signal to the CPU 61 in response to the signal input to the CPU NMI when the switch of the main power supply 80 is turned off. By so doing, even when there arises an abnormality in a software interrupt to the CPU 61, it becomes possible to safely turn off the power supply in a short period of time without being influenced by the abnormality.

Second Embodiment

Next, a second embodiment of an image processing apparatus is described. The same elements of the second embodiment as in the above-described first embodiment are represented by the same reference numerals, and descriptions thereof are omitted.

In the above-described embodiment, the power saving control program executed by the CPU 61 sends the interrupt request notification to all the applications executed by the CPU 61 excluding the power saving control program. In this embodiment, the power saving control program sends the interrupt request notification to specific applications only from among the applications executed by the CPU 61. A specific application refers to, for example, an application which carries out writing processing of image data to the HDD 66. In this case, the kernel stored in the ROM 64 and executed by the CPU 61 detects the writing processing of image data from an application to the HDD 66, and sends to the power saving control program application-specific information to specify an application that has carried out the writing processing of image data to the HDD 66 at least once since a time when the power is supplied to activate the image processing apparatus 50 on which the application has been executed. As the application-specific information, an application number or an application name given to an application beforehand may be used, for example. If the application-specific information is received, the power saving control program stores the application-specific information in a notified applications list. The notified applications list is stored in the RAM 65, for example. If the interrupt signal is input into the power saving control program, the power saving control program sends the interrupt request notification to applications specified by the application-specific information stored in the notified applications list from among the applications executed by the CPU 61.

Next, the procedure in an interruption control process for the power supply in the image processing apparatus 50 of this embodiment is described. The procedure in the interruption control process for the power supply of the embodiment is nearly the same as shown in FIG. 3. It is assumed that, before Step S1, the power saving control program receives the application-specific information from the kernel and stores the notified applications list, as described above. After Steps S1 and S2, in Step S3, if the interrupt signal is input, the power saving control program sends the interrupt request notification to an application specified by the application-specific information stored in the notified applications list from among the applications executed by the CPU 61. In Step S5, an application which has received the interrupt request notification interrupts a process in a recoverable way. An application which has not received the interrupt request notification does not carry out the writing processing of image data to the HDD 66. For this reason, it is not probable that a problem occurs when the power supply is interruption while a process is running and a process may not be interrupted by the interrupt request notification. Thus, the interrupt request notification is sent only to the applications in which processing have to be interrupted when the power supply is interruption, so that the interruption control process for the power supply can be made more efficient. It is also possible to reduce the influence of a fault in the application due to the interruption of power supply.

In this embodiment, since only the specific applications are interrupted of the processes in a recoverable way, it becomes possible to reduce the total time necessary to interrupt processes. For this reason, in this embodiment, the power saving control program may set the first predetermined time, whose lapse is measured since the interrupt request notification has been sent, to be shorter than in the first embodiment.

Third Embodiment

Next, a third embodiment of an image processing apparatus is described. The same elements of the third embodiment as in the above-described first or second embodiment are represented by the same reference numerals, and descriptions thereof are omitted.

In the above-described first embodiment and second embodiment, the power saving control program carries out the interruption process of the power supply. However, when a fault occurs in the power saving control program, the interruption of the power supply may become impossible. For this reason, in this embodiment, the kernel that constitutes a core part in a lowermost layer of the OS controls the interruption process of the power supply. Specifically, If a signal is output from the CPU NMI when the switch of a main power supply 80 is turned off in response to the user's operation, the interrupt detection thread that operates in the kernel detects the signal and sends an interruption signal to turn off the power supply to the power saving control program. The kernel outputs the interruption signal of the power supply to turn off the power supply from the PSU 90 to the controller 60 and the engine section 70 if a time lapse reaches a second predetermined time, or if the kernel receives a power-off request notification from the power saving control program for requesting the interruption of the power supply from the PSU 90 to the controller 60 and the engine section 70 before the time lapse, that is measured since a time when the power-off notification has been sent by the kernel, reaches the second predetermined time. The second predetermined time may be equal to or longer than the first predetermined time. The power saving control program sends an interrupt request notification to all the applications executed by the CPU 61 excluding the power saving control program in receiving the power-off notification, and sends the power-off request notification to the kernel after a time lapse, that is measured since a time when the power-off notification has been sent, reaches the first predetermined time. Similarly to the first embodiment, each application, in receiving the interrupt request notification, interrupts a process in a recoverable way in response to the interrupt request notification.

Figure 4:
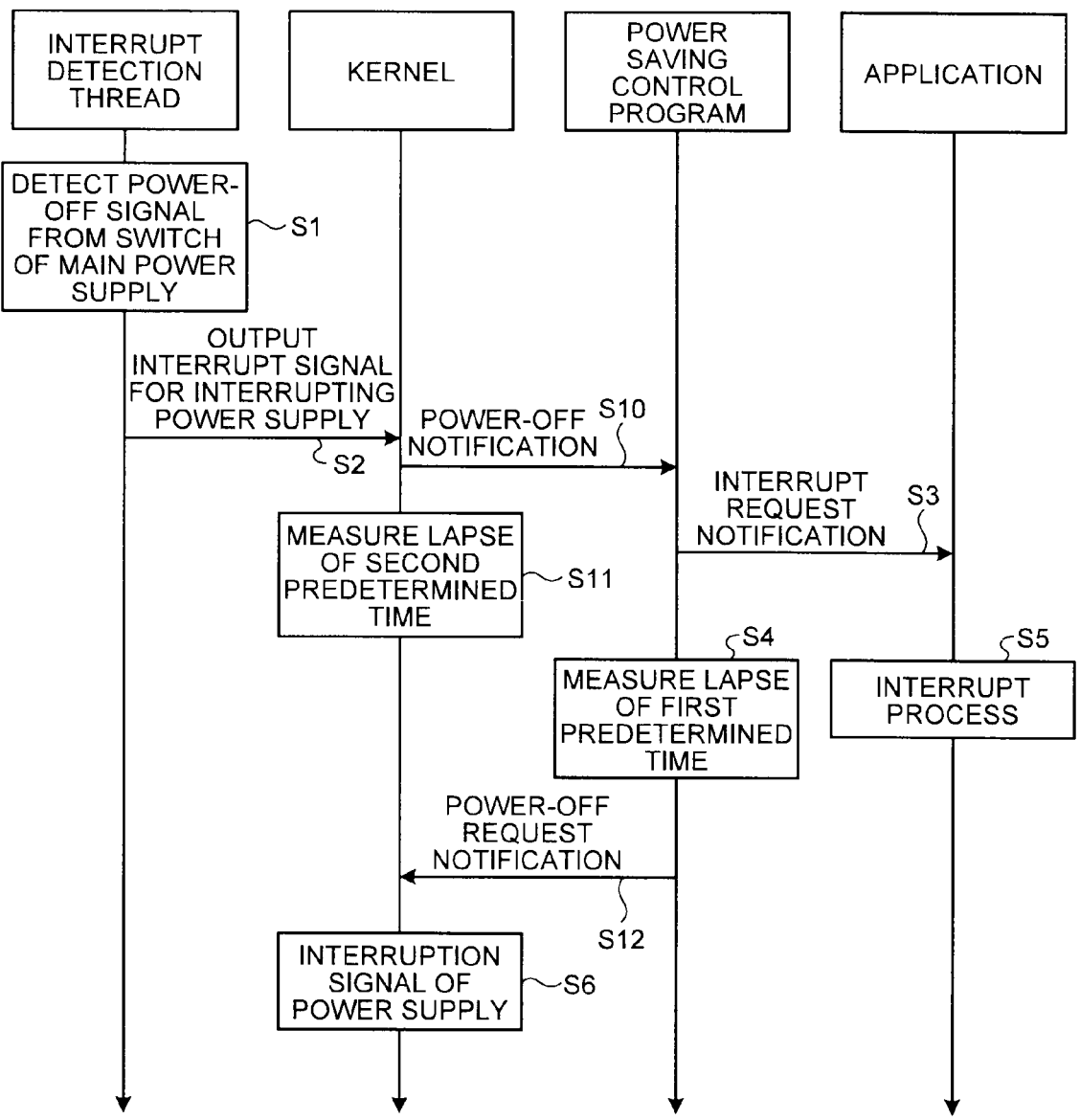
FIG. 4 is a flowchart showing the procedure in a interruption process of the power supply in an image processing apparatus 50 according to a third embodiment.

Next, a procedure in an interruption process of the power supply in the image processing apparatus 50 of this embodiment is described with reference to FIG. 4. Steps S1 and S2 are the same as in the first embodiment. In Step S10, if the interrupt signal from the CPU NMI is input to the kernel executed by the CPU 61, the kernel sends the power-off notification to the power saving control program. Thereafter, in Step S11, the kernel starts to measure a lapse of a second predetermined time. In Step S3, if the power-off notification is received, the power saving control program sends the interrupt request notification to all the applications executed by the CPU 61 excluding the power saving control program. Steps S4 and S5 are the same as in the first embodiment. In Step S12, if the measurement of the first predetermined time finishes, the power saving control program sends the power-off request notification to the kernel. In Step S6, if the measurement of the second predetermined time has finished, or if the power-off request notification is received from the power saving control program before the measurement of the second predetermined time finishes, the kernel outputs the interruption signal of the power supply. The interruption signal of the power supply is input to the PSU 90 and, accordingly, the power supply from the PSU 90 to the controller 60 and the engine section 70 is turned off.

With the above-described configuration, even when the kernel fails to receive the power-off request notification from the power saving control program, if the measurement of the second predetermined time finishes, the kernel turns off the power supply from the PSU 90 to the controller 60 and the engine section 70. Therefore, even when a fault occurs in the power saving control program or in other applications, the possibility for the occurrence of the problems in (a) or (b) can be reduced. Hence, it is possible to avoid a case in which it is incapable of turning off the power supply due to a fault in an application in the image processing apparatus 50.

Fourth Embodiment

Next, a fourth embodiment of an image processing apparatus is described. The same elements of the second embodiment as in the above-described first to third embodiments are represented by the same reference numerals, and description thereof will not be repeated.

Although the kernel is allowed to control the interruption process of the power supply in the above-described third embodiment, there is a possibility that a fault in the kernel disables to turn off the power supply. Even when the kernel does not contain any faults, there is a possibility that the power supply may not be turned off if a fault occurs and a hardware interrupt is continuously executed on the CPU 61. For this reason, according to this embodiment, in the image processing apparatus 50, the interruption of the power supply is controlled by both hardware and software.

Figure 5:
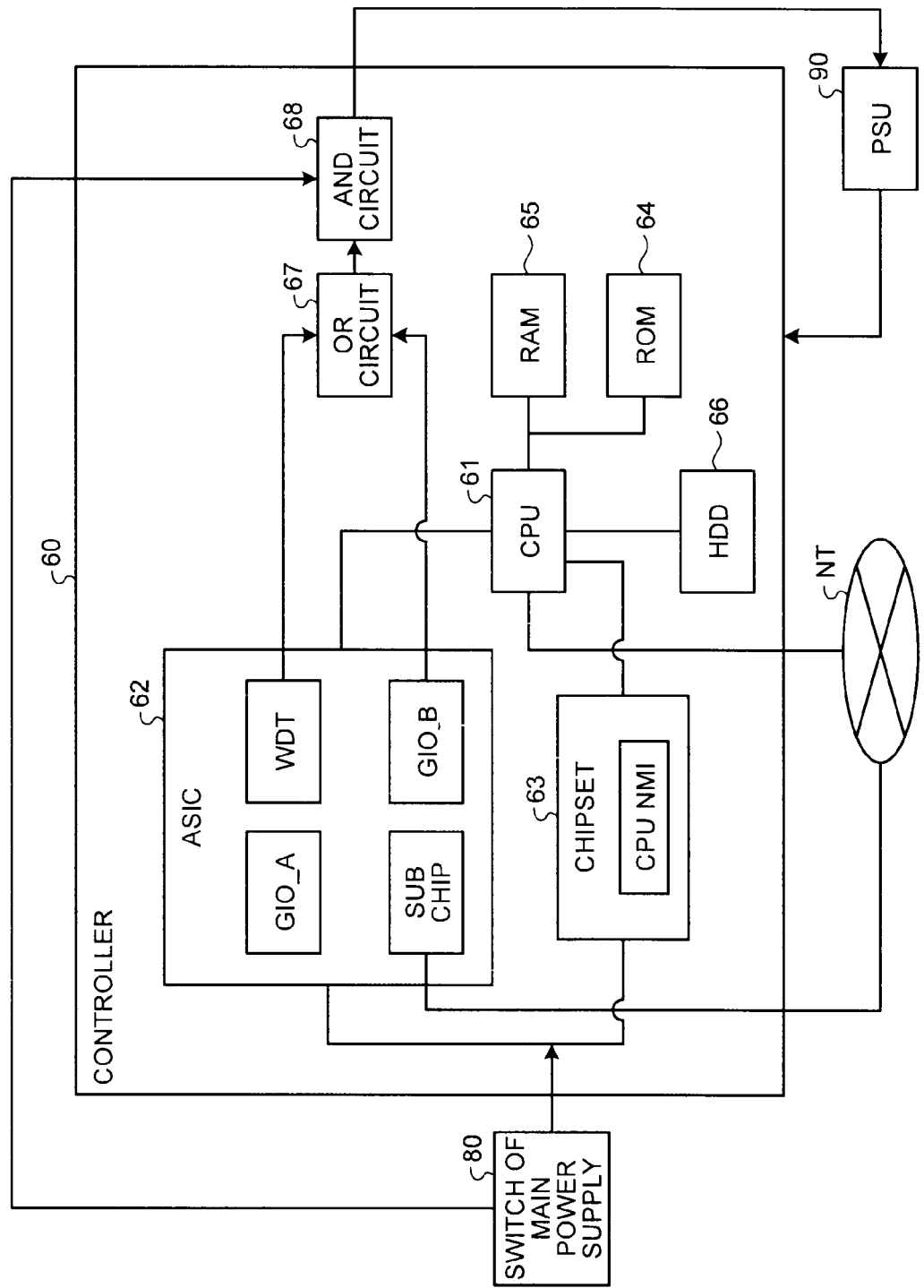
FIG. 5 is a diagram illustrating an outline of a configuration of the controller 60 according to a fourth embodiment.

FIG. 5 is a diagram illustrating the outline of the configuration of the controller 60 of this embodiment. The controller 60 includes an OR circuit 67 and an AND circuit 68, in addition to the CPU 61, the ASIC 62, the chipset 63, the ROM 64, the RAM 65, and the HDD 66. The ASIC 62 has GIO_A, GIO_B, a WDT, and a subchip.

Here, an operation mode which is set in the image processing apparatus 50 of this embodiment is described. The operation mode includes a normal operation mode and a power saving mode. The normal operation mode refers to a mode in which power at a predetermined voltage is supplied from the PSU 90 to the controller 60, the HDD 66, and the engine section 70. The power saving mode refers to a mode in which the power supply to the whole or a part of the controller 60, the engine section 70, and the HDD 66 is turned off, and power at a voltage smaller than the predetermined voltage is supplied. Although the image processing apparatus 50 is set in the normal operation mode after being activated, the operation mode is switched to the power saving mode if a transition condition is satisfied. The transition condition includes a case in which no input from an operation section is detected for a period longer than a predetermined time. In the image processing apparatus 50 which is set in the power saving mode, when a return condition is satisfied, the image processing apparatus 50 returns to the normal operation mode. The return condition includes, for example, a case in which there is an input from an operation input section, or the like. The CPU 61 carries out the transition from the normal operation mode to the power saving mode by the power saving control program, and the CPU 61 carries out the return from the power saving mode to the normal operation mode by an interruption control thread.

An interruption control thread that is generated by the kernel of the OS executed by the CPU 61 controls the interruption process of the power supply in response to the operation mode. The interruption control thread operates independently of the interrupt detection thread. Before the image processing apparatus 50 is set in the normal operation mode after being activated, the interruption control thread activates the WDT through a WDT driver that operates in the kernel and writes data into a writable area in the WDT at every predetermined time to carry out refresh on the WDT. If no refresh is carried out for a period of time that is longer than a predetermined time, there is a possibility that abnormality occurs in the CPU 61 itself or the kernel of the OS executed by the CPU 61. When the transition condition is satisfied, the interruption control thread turns off a function of the WDT through the WDT driver and a GIO_B described below is turned off before the image processing apparatus 50 is switched to the power saving mode by the power saving control program. If the return condition is satisfied, the interruption control thread activates the WDT through the WDT driver to turn on the GIO_B before the image processing apparatus 50 returns to the normal operation mode. As in the third embodiment, if the signal output when the switch of a main power supply 80 is turned off in response to a user's operation is output from the CPU NMI, and the interrupt detection thread that operates in the kernel detects the signal, the power-off notification indicative of the power-off is sent to a notification driver that operates in the same kernel, and the interruption control thread that operates in the kernel starts to measure the second predetermined time. If the second predetermined time arrives or if the interruption control thread receives the power-off request notification from the power saving control program before the second predetermined time arrives, the interruption control thread causes the HDD driver to turn off the power supply to the HDD 66, and the GIO_B is turned off. The notification driver sends the power-off notification indicative of the power-off to the power saving control program. The contents of the operations of the power saving control program and the contents of the operations of applications having received the interrupt request notification are the same as in the above-described third embodiment.

Returning to FIG. 5, and the description is continued. Instead of the CPU 61, the subchip performs a communication processing through the network NT when the image processing apparatus 50 is switched to the power saving mode. If no refresh is carried out for a period of time that is longer than a predetermined time, the WDT outputs a signal (referred to as a WDT signal) indicative of the status to the OR circuit 67. The GIO_A is a switch circuit that is controlled by the kernel executed on the CPU 61, and if the switch of a main power supply 80 is detected to be turned off, the GIO_A is switched off. The GIO_B is a switch circuit and is switched between ON and OFF under the control of the interruption control thread. Immediately after the image processing apparatus 50 is activated, the GIO_B is in the off state, and at this time, if the switch of a main power supply 80 is turned off, the power supply of the image processing apparatus 50 is turned off via the OR circuit 67 and the AND circuit 68 described below. However, if the GIO_B is turned on by the interruption control thread, to switch off the switch of a main power supply 80 alone does not suffice to turn off the power supply of the image processing apparatus 50 via the OR circuit 67 or the AND circuit 68.

When the WDT signal is output from the WDT or when the GIO_B is in the off state, the OR circuit 67 outputs the interruption signal of the power supply to the AND circuit 68. When a signal to turn off the power supply is output from the switch of a main power supply 80 and the interruption signal of the power supply is output from the OR circuit 67, the AND circuit 68 outputs the interruption signal of the power supply. The interruption signal of the power supply is input to the PSU 90, and the power supply from the PSU 90 to the controller 60 and the engine section 70 is turned off, so that the power supply of the image processing apparatus 50 is turned off.

Next, the procedure in a process in the image processing apparatus 50 of this embodiment is described.

Figure 6:
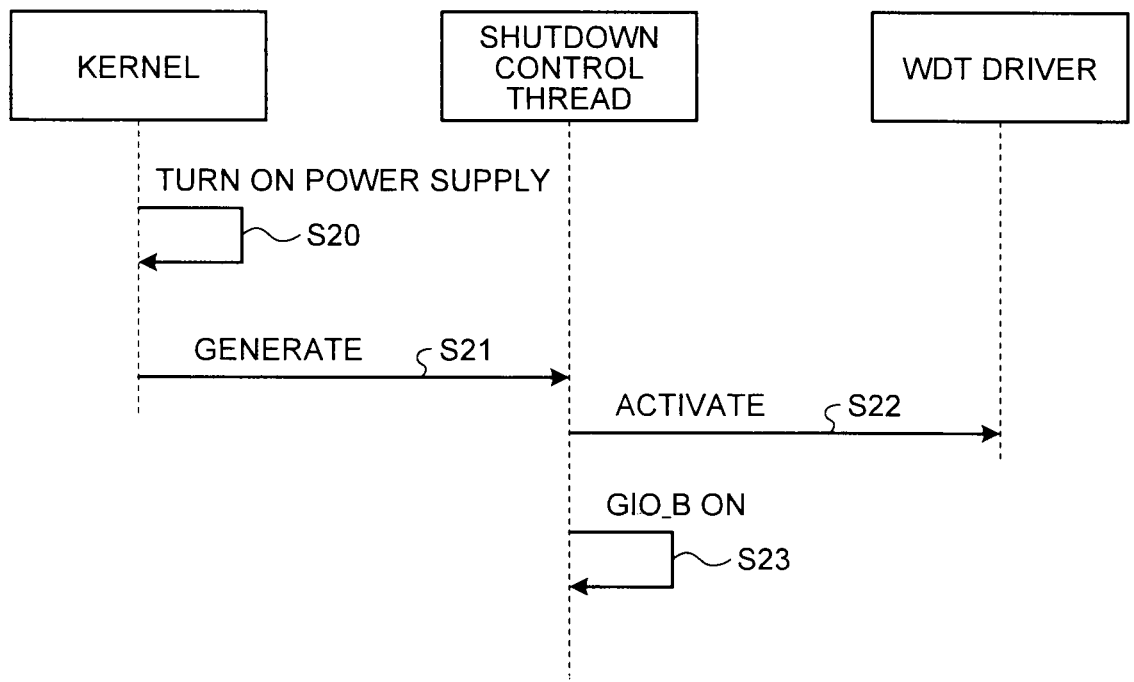
FIG. 6 is a flowchart showing a procedure in a process when the image processing apparatus 50 is activated.

First, with reference to FIG. 6, it is described of the procedure in a process when the switch of a main power supply 80 of the image processing apparatus 50 is turned on. When the power is supplied from the PSU 90 to the controller 60 and the engine section 70 to activate the image processing apparatus 50, if the power is supplied to the CPU 61 of the controller 60 (Step S20), the CPU 61 executes the kernel and causes the kernel to generate and start to execute the interruption control thread (Step S21). The interruption control thread activates the WDT through the WDT driver that operates in the kernel (Step S22). Thereafter, the GIO_B is turned on (Step S23), and refresh is carried out on the WDT through the WDT driver at every predetermined time. While the transition condition is not satisfied, the image processing apparatus 50 operates in the normal operation mode.

Figure 7:
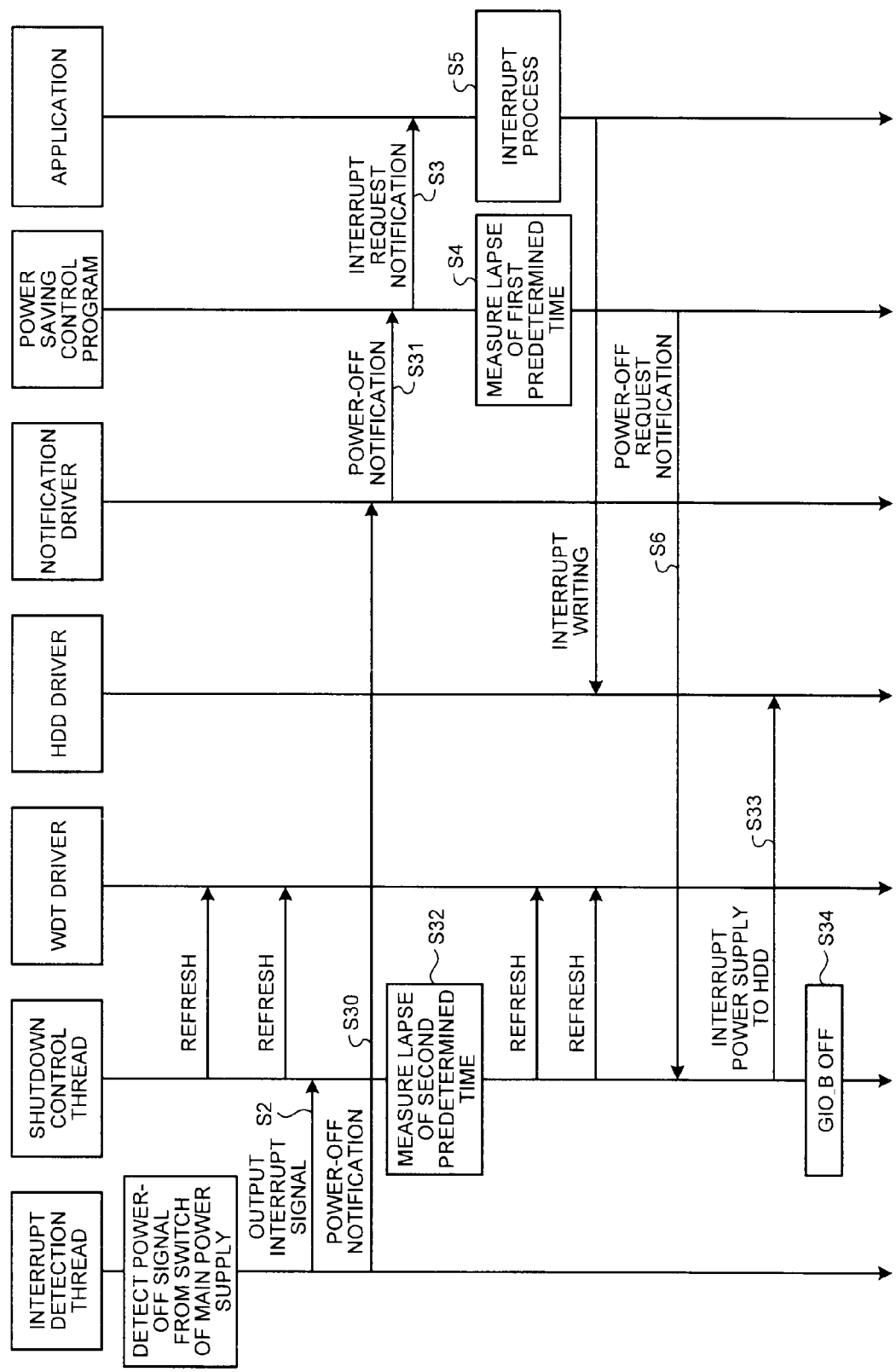
FIG. 7 is a flowchart showing a procedure in a power off control process in a normal operation mode.

Next, the procedure in an interruption process of the power supply in the normal operation mode is described with reference to FIG. 7. Steps S1 and S2 are the same as in the first embodiment. In Step S30, if the interrupt signal from the CPU NMI is input to the notification driver that operates in the kernel, in Step S31, the notification driver sends the power-off notification to the power saving control program. Thereafter, in Step S32, the interruption control thread starts to measure the second predetermined time. Steps S3 to S6 are the same as in the first embodiment. In Step S33, if the second predetermined time arrives or if the power-off request notification is received from the power saving control program before the second predetermined time arrives, the interruption control thread causes the HDD driver to turn off the power supply to the HDD 66, and in Step S34, the GIO_B is turned off. At this time, the interruption signal of the power supply is output from the OR circuit 67 to the AND circuit 68. In the AND circuit 68, the interruption signal of the power supply is output since the signal when the switch of a main power supply 80 is turned off is output and the interruption signal of the power supply is output from the OR circuit 67. The interruption signal of the power supply is input to the PSU 90, and the power supply from the PSU 90 to the controller 60 and the engine section 70 is interrupted, so that the power supply of the image processing apparatus 50 is turned off.

When refresh that is carried out on the WDT by the interruption control thread through the WDT driver is not carried out for a longer period than the predetermined time, the WDT signal is output from the WDT and input to the OR circuit 67, and the interruption signal of the power supply is output from the OR circuit 67 to the AND circuit 68. As a result, the interruption signal of the power supply is input to the PSU 90, and the power supply from the PSU 90 to the controller 60 and the engine section 70 is interrupted, so that the power supply of the image processing apparatus 50 is turned off.

Figure 8:
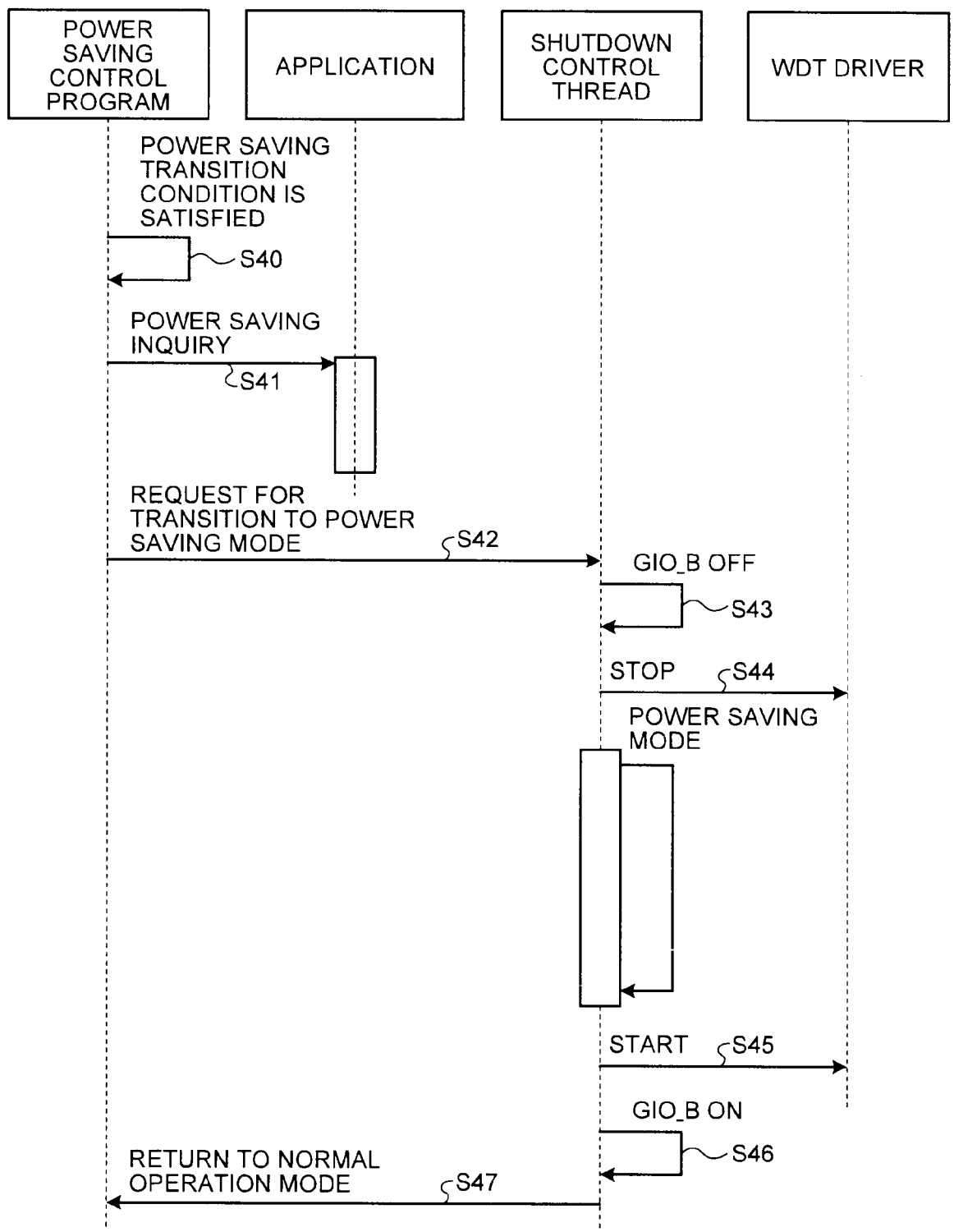
FIG. 8 is a flowchart showing a procedure in a process for controlling ON and OFF of a watch dog timer (WDT) and GIO_B (GIO=global input/output)

Next, with reference to FIG. 8, it is described of the procedure in a process for controlling the ON and OFF of the WDT and the GIO_B when the transition condition is satisfied and the operation mode is switched to the power saving mode or when the return condition is satisfied and the operation mode returns to the normal operation mode. When it is detected that the transition condition is satisfied (Step S40), the power saving control program sends a power saving inquiry for inquiring the possibility of the transition to the power saving mode to each application executed by the CPU 61 excluding the power saving control program (Step S41). When the power saving control program receives responses to accept the transition to the power saving mode from all the applications, the power saving control program requests the interruption control thread generated by the kernel to transit to the power saving mode (Step S42). The interruption control thread stops the power supply from the PSU 90 to the whole or a part of the controller 60, the engine section 70, and the HDD 66, and then turns off the GIO_B (Step S43) to stop the function of the WDT (Step S44). At this state, when the switch of a main power supply 80 is turned off, the power supply of the image processing apparatus 50 is turned off through the OR circuit 67 and the AND circuit 68. In contrast, when the switch of a main power supply 80 is not turned off, if it is detected that the return condition is satisfied, the interruption control thread causes the kernel to return to the normal operation mode and activates the WDT through the WDT driver to start refresh on the WDT at every predetermined time (Step S45). Thereafter, the interruption control thread turns on the GIO_B (Step S46). At this state, switching off the switch of a main power supply 80 does not suffice to turn off the power supply of the image processing apparatus 50 the OR circuit 67 and the AND circuit 68. The interruption control thread returns the power saving control program to the normal operation mode, and causes power supply from the PSU 90 to the controller 60, the engine section 70, and the HDD 66 (Step S47).

As described above, both software and hardware, such as the WDT, the OR circuit 67, and the AND circuit 68, are used for the control to turn off the power supply, such that, even when a fault occurs in software, such as the kernel or the power saving control program, it is possible to avoid the situation that the power supply may not be turned off in the image processing apparatus 50.

When the image processing apparatus 50 is switched to the power saving mode, the function of the WDT is stopped and the GIO_B is turned off to invalidate the control to turn off the power supply by software. Thus, when the switch of a main power supply 80 is turned off, it is possible to turn off the power supply of the image processing apparatus 50 without any controls by software. Thus, it is possible to avoid the situation that the power supply may not be turned off in the image processing apparatus 50 that is set in the power saving mode.

When the image processing apparatus 50 returns to the normal operation mode, the WDT is activated and the GIO_B is turned on to validate the control to turn off the power supply by software. Thus, in the image processing apparatus 50 that is in the normal operation mode, in response to the operation to switch off the switch of a main power supply 80, it is possible to turn off the power supply in a short period of time while suppressing the occurrence of abnormality during writing to a nonvolatile storage unit.

Modification

The invention is not limited to the foregoing embodiments, and can be embodied by modifying components without departing from the scope of the invention when the invention is carried out. Various inventions can be formed by appropriately combining a plurality of components disclosed in the foregoing embodiments. For example, some components may be deleted from all components shown in an embodiment. Components common to different embodiments may be appropriately combined. Various modifications described below can be made.

In the above-described embodiments, various programs which are run on the image processing apparatus 50 may be stored in a computer connected to a network such as Internet, and may be downloaded and provided through the network. Various programs may be recorded in a computer-readable recording medium, such as a CD-ROM, a flexible disk (FD), a CD-R, or a digital versatile disk (DVD), as a file of an installable or executable format and may be provided as a computer program product.

In the above-described embodiments, the image processing apparatus 50 may include an image forming section that forms an image subjected to an image processing in the ASIC 62 on a printing medium, such as paper. For example, the image processing apparatus 50 may include, for example, a printer engine such as a monochrome plotter, a one-drum plotter, or a four-drum plotter, to implement a printer function, a scanner to implement a copy function or a scanner function, a facsimile unit to implement a FAX communication function, or the like.

In the above-described first or second embodiment, each application may carry out a process in response to the interrupt request notification and may then send a response notification indicative of the completion of the process to the power saving control program. If the response notification is received from all the applications which have received the interrupt request notification, the power saving control program may output the interruption signal of the power supply even when the first predetermined time does not arrive.

Although the notified applications list is stored in the power saving control program in the above-described second embodiment, the notified applications list may be stored in the kernel. In this case, for example, if the interrupt signal is input, the power saving control program may request the kernel for application-specific information stored in the notified applications list, and if the application-specific information is acquired from the kernel, may send the interrupt request notification to an application specified by the application-specific information.

In the above-described embodiments, the CPU NMI outputs the signal when the switch of a main power supply 80 is turned off, and the hardware interrupt is executed on the CPU 61. However, the invention is not limited thereto. A software interrupt may be executed on the CPU 61 in response to the signal when the switch of a main power supply 80 is turned off. In this case, the chipset 63 may not have the CPU NMI. With this configuration, even in the CPU 61 using an architecture (for example, MIPS or the like) in which the normal start is not easily recovered after a process has been performed in response to an interrupt based on a signal output from the CPU NMI, it becomes possible to terminate the power supply more quickly and safely.

Figure 9:
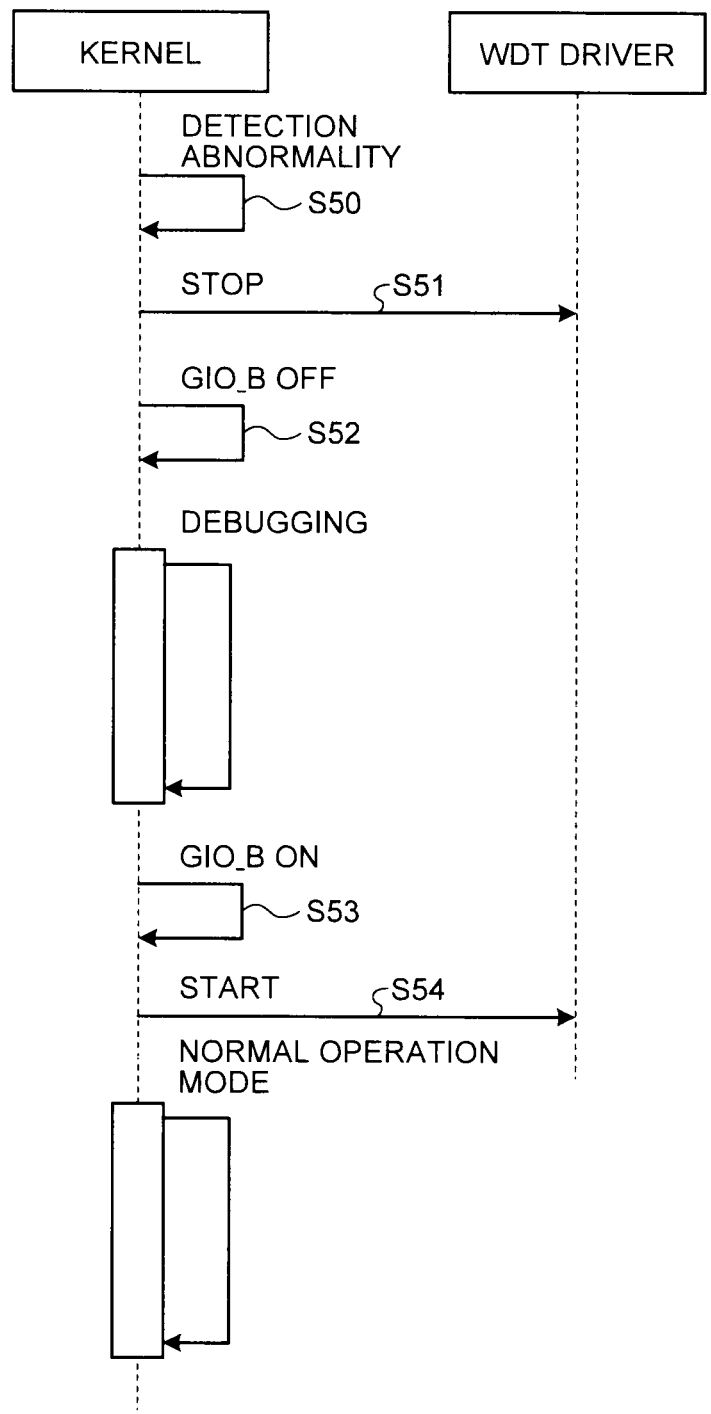
FIG. 9 is a flowchart showing a procedure in a process according to a modification.

In the above-described fourth embodiment, switching between the on state and the off state of the WDT and the GIO_B may be controlled in response to the detection of abnormality in the image processing apparatus 50. FIG. 9 is a flowchart showing the procedure in a process according to this modification. If the kernel that is executed on the CPU 61 detects abnormality in the image processing apparatus 50 (Step S50), the function of the WDT is stopped through the WDT driver (Step S51) to turn off the GIO_B (Step S52). Here, the reason why the kernel itself, not the interruption control thread, controls the ON and OFF of the WDT and the GIO_B is that there is a possibility that scheduling of the interruption control thread may not be carried out because an operation should be carried out in an interrupt inhibition state when abnormality is detected. After the occurrence of abnormality is detected, the kernel notifies the user of the situation. For example, the kernel displays the occurrence of abnormality on a display section. In this state, a developer may carry out recovery by a debugger (which operates in the interrupt inhibition state) in the kernel and may return the image processing apparatus 50 to the normal operation mode. In this case, for example, an input indicative of the return to the normal operation mode is done through an operation section, and if the input is received, the kernel turns on the GIO_B (Step S53) before returning to the normal operation mode and activates the WDT through the WDT driver (Step S54).

With this configuration, when abnormality occurs in the image processing apparatus 50, the function of the WDT is stopped and the GIO_B is turned off to invalidate the control to turn off the power supply by software. Thus, even when the kernel debugger is caught, when the switch of a main power supply 80 is turned off, it is possible to turn off the power supply of the image processing apparatus 50 without being controlled by software. For this reason, in the image processing apparatus 50 in which abnormality occurs, it is possible to avoid the situation that the power supply may not be turned off.

When the image processing apparatus 50 is recovered and returned to the normal operation mode, the WDT is activated and the GIO_B is turned on to validate the control to turn off the power supply by software. Thus, in the image processing apparatus 50 which is set in the normal operation mode, it becomes possible to terminate the power supply more quickly and safely.

In the above-described embodiments, an order may be given to each application to which the interrupt request notification is sent, and the interrupt request notification may be sent according to the order, so that each application interrupts a process in a recoverable way.

Figure 10:
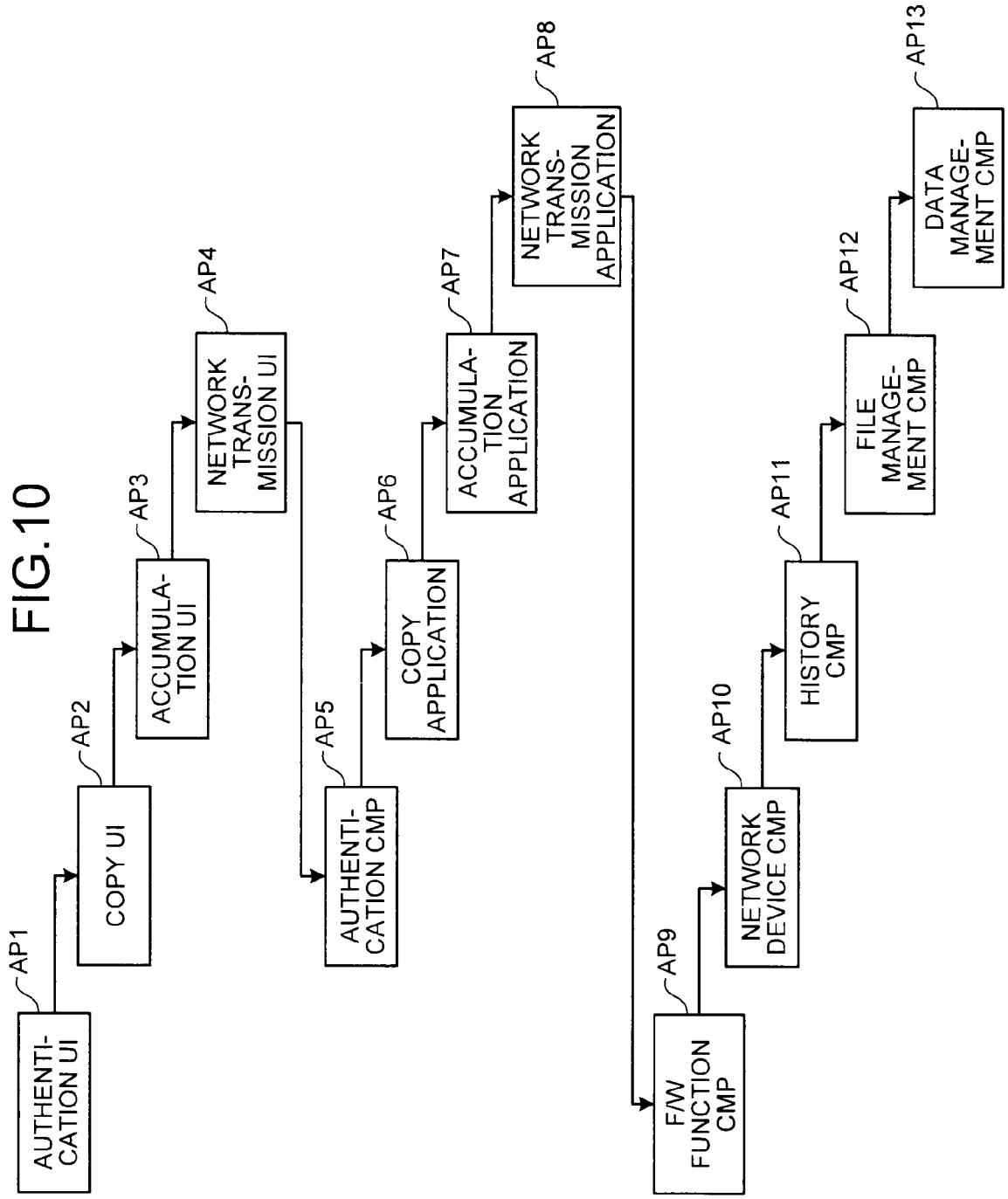
FIG. 10 is a diagram schematically illustrating a serial order given to each application according to a modification.

As the order, for example, a serial order may be given to each application. FIG. 10 is a diagram schematically illustrating a serial order given to each application. In FIG. 10, AP1 to AP13 indicate respective applications, and an arrow from each application indicates an order. When this order is given, the interrupt request notification may be sent in the order from AP1 to AP13.

Figure 11:
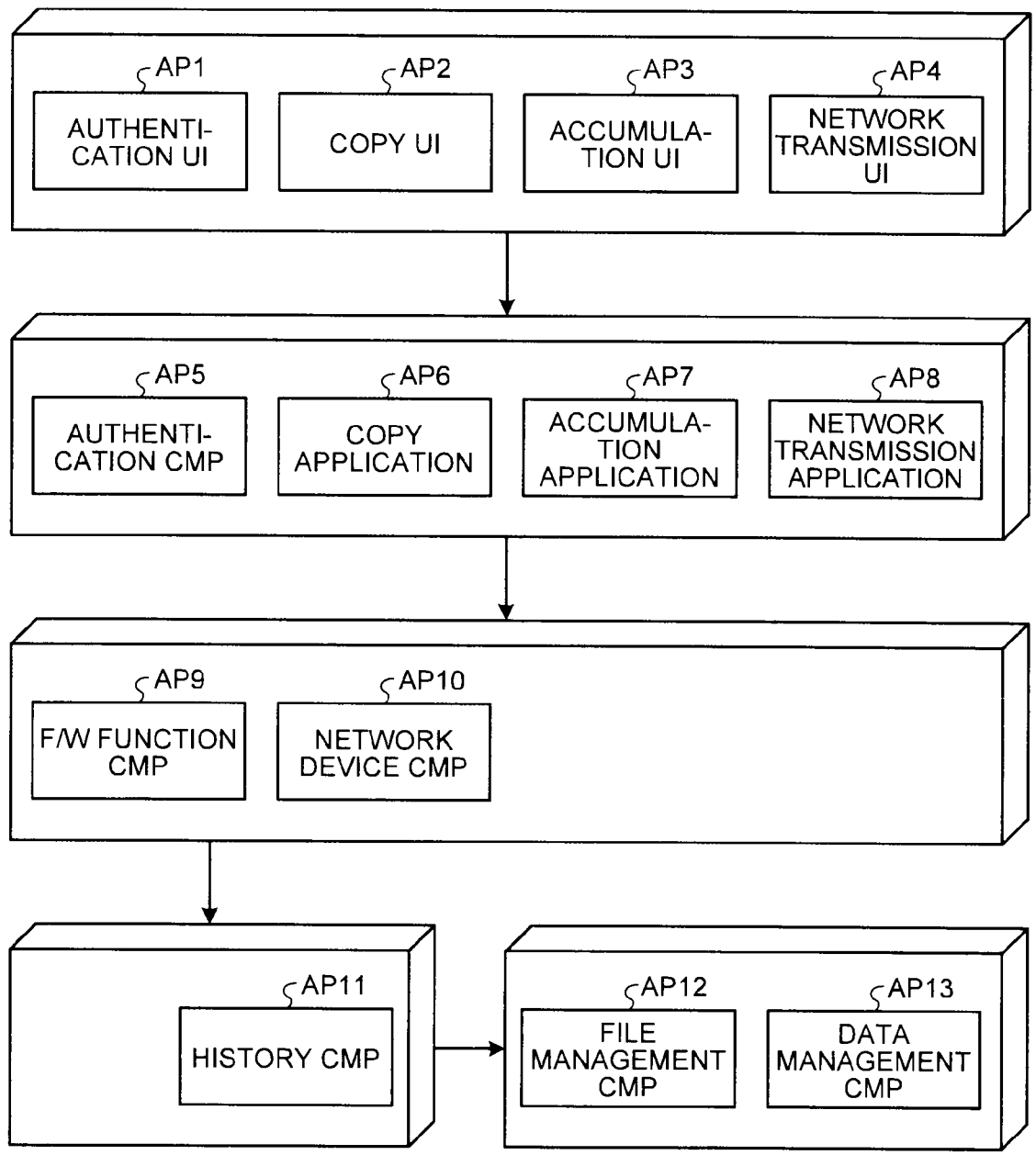
FIG. 11 is a diagram schematically illustrating an order given to groups of applications according to a modification.

With regard to the order, as illustrated in FIG. 11, applications may be divided into a plurality of groups, and an order may be given to the respective groups. A group includes applications which have no functional dependence so as to avoid any problems even when the power supply to the applications is terminated simultaneously. When this order is given, the interrupt request notification may be sent in the order of groups: a group consisting of the applications from AP1 to AP4, a group consisting of the applications from AP5 to AP8, a group consisting of the applications AP9 and AP10, a group consisting of the application AP11, and a group consisting of the applications AP12 and AP13. With this configuration, it is possible to interrupt processes in parallel in the applications. Therefore, in the image processing apparatus 50, it is possible to terminate the power supply safely and efficiently.

Figure 12:
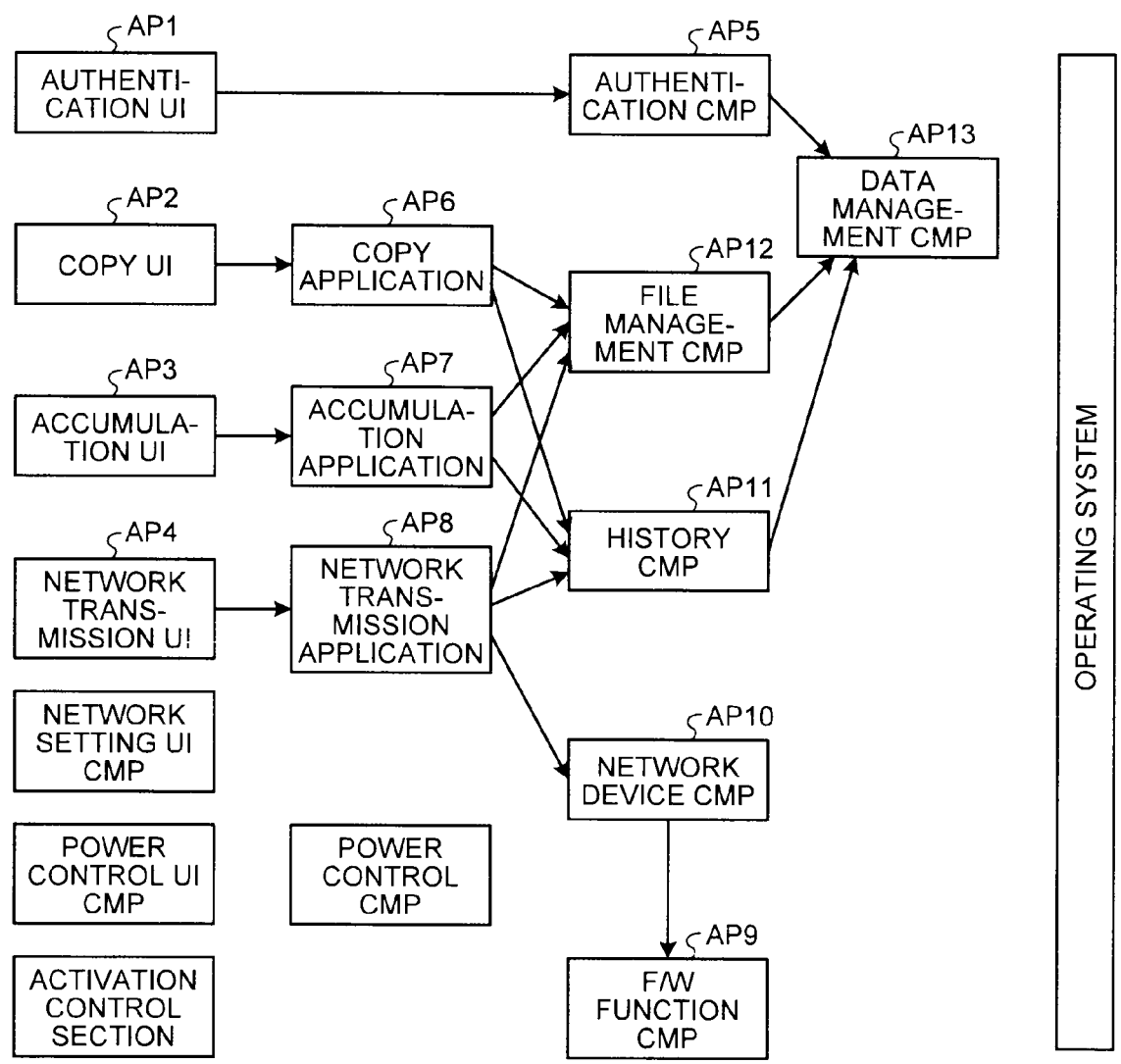
FIG. 12 is a diagram schematically illustrating a tree-shaped order given to an application according to a modification.
Figure 13:
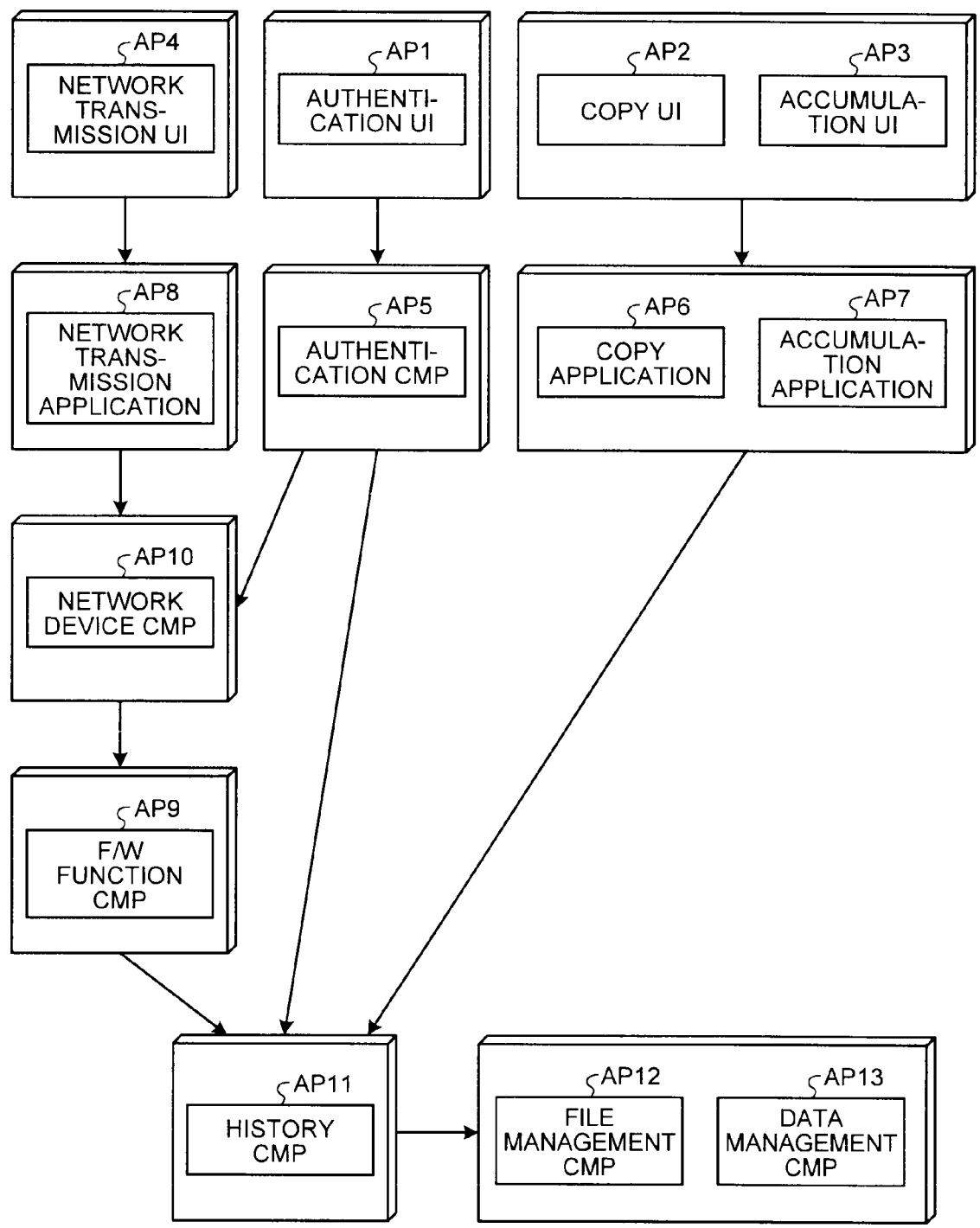
FIG. 13 is a diagram schematically illustrating a net-shaped order given to an application according to a modification.

With regard to the order, as illustrated in FIG. 12, a tree-shaped order may be used. As illustrated in FIG. 13, a net-shaped order may be used. These orders are used when a plurality of reboot sequences are defined. When these orders are given, the interrupt request notification may be sent in order of AP4, AP8, AP10, AP9, and AP11, may be sent in order of AP1, AP5, and AP11, may be sent in order of a group of AP2 and AP3, a group of AP6 and AP7, and AP11, and may be sent in order of AP12 and AP13 after AP11. With this configuration, it is possible to configure a plurality of safe reboot sequences, making it possible to carry out a partial reboot at a high speed.

According to the invention, it becomes possible to terminate the power supply in a short time according to a user's operation for requesting the termination of the power supply while suppressing the occurrence of abnormality during writing to a nonvolatile storage unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus having a plurality of applications including at least an application for carrying out writing to a nonvolatile storage unit and an application for carrying out an image process that are executable thereon, the image processing apparatus comprising:
   a switch of a main power supply unit that is switched between ON and OFF in response to a user's operation so as to switch the power supply between a supply of power and an interruption of the supply;
   a first notification unit that sends an interrupt request notification for requesting to interrupt a process in a recoverable way to all of or a part of the applications being run if the switch of the main power supply unit is turned off;

a power supply control unit that interrupts the supply from the power supply when a time lapse, that is measured since a time when the notification unit has sent the interrupt request notification, exceeds a first predetermined time; and an execution unit that executes an operating system and executes all of or a part of a plurality of applications, wherein the first notification unit is implemented by a first application executed by the execution unit, a second notification unit and the power supply control unit are implemented such that the second notification unit sends a power-off notification to the first notification unit to notify that the power supply is turned off when the switch of the main power supply unit is turned off by a kernel that is executed by the execution unit of the operating system, the power supply control unit interrupts the power supply from the power supply when a time lapse, that is measured since a time when the second notification unit has sent the power-off notification, exceeds a second predetermined time, or when the power supply control unit receives a power-off request notification from the first notification unit for requesting to interrupt a supply from the power supply before the time lapse reaches the second predetermined time, and when the first notification unit receives the power-off notification, the first notification unit sends the interrupt request notification to all of or a part of a plurality of applications excluding the first application and sends the power-off request notification to the kernel when the time lapse, that is measured since a time when the interrupt request notification has been sent, reaches the first predetermined time.

2. The image processing apparatus according to claim 1, wherein the first notification unit sends the interrupt request notification to an application that has carried out the writing to the storage unit at least once after having been executed on the image processing apparatus since a time when the application has been supplied with power to be activated.

3. The image processing apparatus according to claim 1, further comprising:
a switch that is switched between ON and OFF by the power supply control unit;
a watch dog timer that outputs a signal indicative of a situation if refresh is not carried out for a longer time than a predetermined time by the kernel that carries out refresh at every predetermined time; and
a power supply control circuit that interrupts a supply from the power supply when the switch of a main power supply is turned off and the switch is turned off or when the signal is output from the watch dog timer;
wherein the power supply control unit switches off the switch if the second predetermined time has elapsed since the second notification has sent the power-off notification or if the power supply control unit receives a power-off request notification for requesting the interruption of the power supply has been received from the first notification unit before the second predetermined time arrives.

4. The image processing apparatus according to claim 3, wherein either a first operation mode in which power with a predetermined voltage is supplied or a second operation mode in which power with a voltage lower than the predetermined voltage is supplied is set, and the power supply control unit stops the function of the watch dog timer and switches off the switch when the image processing apparatus is set in the second operation mode.

5. The image processing apparatus according to claim 4, wherein the power supply control unit activates the watch dog timer and switches on the switch when the image processing apparatus returns from the second operation mode to the first operation mode.

6. The image processing apparatus according to claim 3, wherein a switching control unit is implemented in such a way that the switching control unit stops the function of the watch dog timer and switches off the switch if the kernel detects abnormality in the image processing apparatus.

7. The image processing apparatus according to claim 6, wherein the switching control unit activates the watch dog timer and switches on the switch when abnormality in the image processing apparatus has been repaired.

8. The image processing apparatus according to claim 1, further comprising:
a detection unit that detects a signal when the switch of the main power supply unit has been turned off,
wherein, when the detection unit has detected the signal, the first notification unit sends the interrupt request notification to all of or a part of the applications being run.

9. An image processing method for an image processing apparatus having a plurality of applications including at least an application for carrying out writing to a nonvolatile storage unit and an application for carrying out an image process that are executable thereon, the image processing method comprising:
switching, by a switch of a main power supply unit, between ON and OFF in response to a user's operation so as to switch the power supply between a supply of power and an interruption of the supply;
notifying, by a first notification unit, an interrupt request notification for requesting to interrupt a process in a recoverable way to all of or a part of the applications being run if the switch of the main power supply unit is turned off;
interrupting, by a power supply control unit, the supply from the power supply when a time lapse, that is measured since a time when the notification unit has sent the interrupt request notification, exceeds a first predetermined time;
executing, by an execution unit, an operating system and executes all of or a part of a plurality of applications;
executing, by the execution unit, a first application that implements the first notification unit,
sending, by a second notification unit, a power-off notification to the first notification unit to notify that the power supply is turned off when the switch of the main power supply unit is turned off by a kernel that is executed by the execution unit of the operating system,
interrupting, by the power supply unit, the power supply from the power supply when a time lapse, that is measured since a time when the second notification unit has sent the power-off notification, exceeds a second predetermined time, or when the power supply control unit receives a power-off request notification from the first notification unit for requesting to interrupt a supply from the power supply before the time lapse reaches the second predetermined time, and when the first notification unit receives the power-off notification, sending, by the first notification unit, the interrupt request notification to all of or a part of a plurality of applications excluding the first application and sending the power-off request notification to the kernel when the time lapse, that is measured since a time when the interrupt request notification has been sent, reaches the first predetermined time.

\* \* \* \* \*